Oct. 14, 1930.    H. E. MENG    1,778,223
HOSE NOZZLE
Filed Jan. 5, 1928
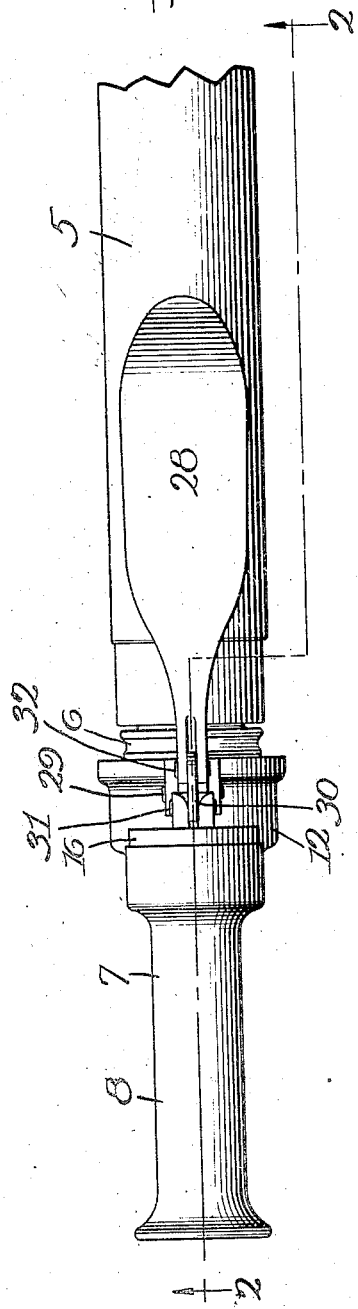
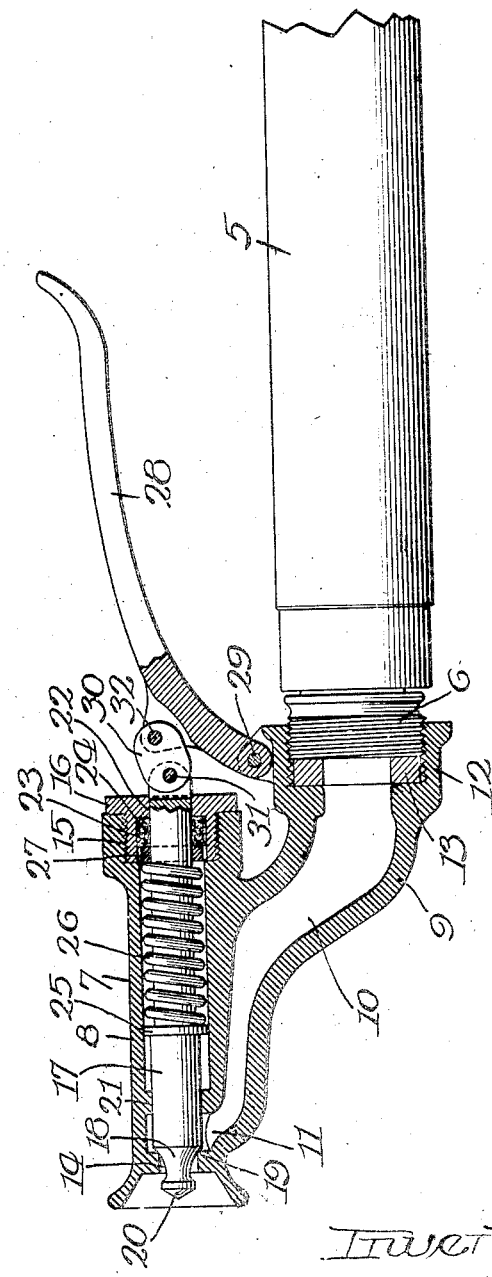
Inventor:
Harry E. Meng Patented Oct. 14, 1930

1,778,223

UNITED STATES PATENT OFFICE

HARRY E. MENG, OF OAK PARK, ILLINOIS, ASSIGNOR TO W. D. ALLEN MANUFACTURING COMPANY, OF CHICAGO, ILLINOIS, A CORPORATION OF ILLINOIS

HOSE NOZZLE

Application filed January 5, 1928. Serial No. 244,600.

This invention relates to hose nozzles, and more particularly to hose nozzles which are adapted to be controlled or regulated so as to cause the stream of water issuing from the hose to be in the form of a coarse or fine spray, or in a solid stream, as may be desired. An example of such a hose nozzle is shown in the patent to Gibbs, No. 1,159,015.

The principal object of the present invention is to provide a hose nozzle of the type referred to above, in which the parts which cooperate to control the stream which issues from the nozzle are accurately supported or maintained in the desired relative position while permitting adjustment thereof, to vary the kind of stream.

Another object is to provide a nozzle of the class described in which means is provided for automatically shutting off the stream; to provide a construction which will not be apt to develop leaks; to provide a structure which is durable and convenient in use; and in general, to provide an improved nozzle of the class described.

Other objects and advantages of the invention will be understood by reference to the following specification and accompanying drawing in which I have illustrated a nozzle and its manner of connection and relationship to a hose with which it is used.

In the drawing:

Fig. 1 is a plan, and

Fig. 2 is a section on the line 2—2 of Fig. 1.

Referring now to the drawings, I have indicated a hose 5, which may be of any usual type of garden hose having a male coupling member 6 secured to its end. A nozzle 7 is shown connected to the hose and includes a tubular or hollow body portion 8 having an offset intake portion 9 which is provided with an inlet passage 10 communicating with the interior of the hollow body portion 8 adjacent the outer end of the latter, as shown at 11. The offset intake portion 9 is provided with a female coupling portion 12 adapted to receive the coupling portion 6 of the hose, a suitable washer 13 being interposed between the end of the hose and a portion of the nozzle for facilitating the establishment of a water-tight joint between the hose and nozzle.

The hollow body portion 8 of the nozzle is provided with a discharge opening 14 in its outer end and the rearward end of the nozzle is preferably counter-bored and threaded as shown at 15, to receive a stuffing box nut 16. A valve stem 17 is inserted into the hollow body portion 8 through the open rear end thereof and the forward end portion of the valve stem is provided with a tapered valve seat portion 18 which is adapted to engage a corner portion 19 around the discharge opening 14, which serves as a valve seat for receiving the tapered portion 18 of the valve stem. It will be apparent that when the tapered seat 18 is seated on the valve seat 19, the discharge opening 14 is closed so as to prevent the passage of water from the inlet 10 therethrough.

The outer end of the valve stem is also provided with a head portion 20, which is adapted to cooperate with the discharge opening 14 to determine the kind of stream which will issue from the nozzle. When the valve stem is moved rearwardly only a slight amount, the head portion 20 is effective to cause the stream which issues from the nozzle to be in the form of a spray, and when the valve stem is moved rearwardly a considerable amount, or until the head 20 is entirely within the body portion 8 of the nozzle, a substantially solid stream will be discharged. Various forms of streams will be discharged according to the relative position of the head portion 20 of the valve stem and the discharge or outlet opening 14.

For slidably supporting and maintaining the valve stem substantially coaxial with the interior of the body portion 8, and particularly the forward end of the valve stem coaxial with the outlet 14, I provide a bearing member or part 21 in the body portion 8. The bearing portion 21 is in the form of an annular inwardly projecting flange which is preferably formed integral with the body, and this bearing portion is preferably disposed as close to the outer end of the valve stem as conditions permit. As clearly shown in Fig. 2, the bearing member in the present instance is disposed in back of but immediately adjacent the inlet opening 11. The rear end of the valve stem 17 is slidably supported substantially coaxial with the body 8 by means of the above mentioned stuffing box nut 16, which is apertured as at 22 to receive the rear end portion of the valve seat. The above described arrangement of bearings which are widely spaced apart for supporting the valve stem are effective to quite accurately maintain the valve stem substantially coaxial with the discharge outlet 14. Hence, the head portion 20 of the valve stem will always be maintained in substantially the same axial relation with the discharge outlet and the kind of stream issuing from the nozzle will always be substantially the same for any one position of adjustment of the head 20 in or relative to the outlet. The bearing arrangement and firm support for the valve stem also insures proper seating of the valve seat 18 on the valve seat 19 to close the outlet.

The stuffing box nut 16 includes a recess 23 which is adapted to receive suitable packing material 24 for preventing leakage around the rear end of the valve stem. For normally maintaining the valve stem in its outward position of adjustment so that the valve seats 18 and 19 are in engagement and the discharge opening thereby closed, I provide the valve stem with an annular flange 25 which serves as a seat for receiving one end of a spring 26, and which spring is compressed between the flange 25 and the charge of packing material 24, a washer 27 being interposed between the end of the spring and the packing material. It will be readily understood that the spring normally urges the valve stem outwardly and at the same time tends to compress the packing material through the agency of the washer 27 to maintain the packing material tightly packed about the valve stem. Hence, there is little likelihood of a leak developing around the rearward end of the valve stem.

It will also be noted that the bearing member 21 which is a fairly close fit around the valve stem 17 and the annular flange 25 which is preferably a fairly close fit in the interior of the body member 8 tend to prevent the passage of water rearwardly in the body portion, so that there is but little pressure developed in the portion of the hollow body which is occupied by the spring 26, and hence the prevention of leakage around the rear end of the valve stem is facilitated.

For controlling or actuating the valve stem 17 against the pressure of the spring 26, I provide a handle or lever 28 which is pivotally mounted at its inner end on the coupling portion 12 of the intake, as shown at 29. A link 30 is pivotally connected to the rear end of the valve stem 17 as shown at 31 and to the lever 28 as shown at 32, so that the valve stem 17 may be pulled rearwardly against the pressure of the spring by depressing the lever 28.

Any suitable form of connection may be provided between the rear end of the valve stem and the lever, but I have found that the above described link connection is advantageous in that it avoids the placing of strains on the valve stem when the latter is pulled rearwardly, and in that it also prevents rotation of the valve stem within the body 8, which might tend to prevent proper coaction of the valve seats 18 and 19. As clearly shown in the drawings, the arrangement is such that the lever 28 extends over the adjacent end portion of the hose. This constitutes a very desirable arrangement in that the hose serves as a counter part for the handle, that is to say, a fixed part towards which the handle may easily be swung about its pivot, and also in that the hose part serves as a grip for the nozzle whereby a very convenient and comfortable means for holding the same is provided. This arrangement also enables the nozzle to be very cheaply manufactured, since there is no excessive quantity of metal involved in its production.

I am aware that changes may be made in the form, proportion and arrangement of parts without departing from the spirit of the invention, the scope of which should be determined by reference to the following claims, the latter being construed as broadly as possible, consistent with the state of the art.

I claim as my invention:

1. In a nozzle of the class described, the combination of a hollow body member having a discharge opening in its front end and an inlet opening in the side wall thereof adjacent said front end, a valve stem slidably mounted in said body with its front end operative in said discharge opening to vary the kind of stream discharged therethrough, a bearing in said body member located rearwardly of said inlet, or slidably supporting the front end of the valve stem substantially coaxial with the discharge opening, means also carried by said body member for slidably supporting the rearward end of said valve stem substantially coaxial with said discharge opening, means for effecting relative axial movement between said valve stem and body portion, and resilient means disposed between said bearing and said supporting means for resiliently urging said valve stem toward a position closing said discharge opening.

2. In a nozzle of the class described, the combination of a hollow body member having a discharge opening in its front end and an inlet communicating with the interior of the body adjacent the outlet, a valve stem slidably mounted in said body with its outer end operative in said discharge opening to vary the kind of stream discharged therethrough, a bearing in said body member rearwardly of said inlet for slidably supporting the front end of the valve stem substantially coaxial with the discharge opening, means carried by said body member for slidably supporting the rearward end of said valve stem, means for effecting relative axial movement between said valve stem and body portion, and resilient means disposed between said bearing and said supporting means for resiliently urging said valve stem toward a position closing said discharge opening.

3. In a nozzle of the class described, the combination of a hollow body member having a discharge opening in its front end and an inlet opening in the side wall adjacent said front end, a valve stem slidably mounted in said body with its front end portion operative in said discharge opening to vary the kind of stream discharged therethrough, a bearing in said body member, formed integral therewith, adjacent said discharge opening but rearwardly of said inlet opening for slidably supporting and maintaining said front end of the valve stem substantially coaxial with said discharge opening, a stuffing box in the rearward end of said body member and around the adjacent end of said valve stem for preventing leakage around said rear end, said stuffing box also serving as a bearing spaced from said first mentioned bearing for slidably supporting the valve stem substantially coaxial with the body member, yielding means located between said bearing and stuffing box, normally urging said valve stem to move forwardly in said body member, means for limiting such forward movement, and means connected to the rear end of said valve stem for effecting axial movement thereof relative to said body member against the force of said yielding means.

4. In a hose nozzle of the class described, the combination of a hollow body member having its front end provided with a discharge opening and its rear end open to permit the insertion of a valve stem into said body, said body member being provided with an inlet communicating with the interior of the body adjacent said discharge opening, a valve stem slidably mounted in said body with its forward end portion disposed adjacent said discharge outlet and operative to vary the kind of stream discharged therethrough, a bearing in said body member, disposed in back of said inlet and adjacent the forward end of said valve stem, for slidably supporting said forward end substantially coaxial with the discharge opening, a stuffing box removably mounted on the rear end of the body member and around a rear end portion of the valve stem for preventing leakage therearound, said stuffing box also serving as a bearing for slidably supporting the adjacent portion of the valve stem, a rearwardly facing abutment on said valve stem intermediate its ends, a coil spring disposed around the valve stem and compressed between said abutment and stuffing box for normally urging the valve stem to move forwardly, means for limiting such forward movement and constituting a valve for closing the discharge opening, and a lever connected to the rear end of said valve stem for effecting rearward movement of the stem against the pressure of said spring.

5. A nozzle of the class described, comprising a tubular body portion having a discharge opening, an intake part adapted to be connected to a hose and having an outlet communicating with said body part rearwardly of said discharge opening; a valve stem arranged co-axially in said body part and having means adjacent one end thereof for closing said outlet opening and for co-operating therewith to vary the type of spray; a bearing in said body part adjacent the rear end thereof for supporting said valve stem; a second bearing disposed between said first-mentioned bearing and said outlet, said bearings co-operating to maintain said valve stem co-axially aligned with said body portion; resilient means disposed between said bearings for urging said valve stem toward said discharge opening, and means for manually moving said valve stem against the action of said resilient means.

HARRY E. MENG.